United States Patent [19]

Schochat

[11] 4,130,755
[45] Dec. 19, 1978

[54] CB TWENTY METER

[76] Inventor: Nathaniel E. Schochat, 620 Forest Hill Rd., Macon, Ga. 31204

[21] Appl. No.: 729,829

[22] Filed: Oct. 5, 1976

[51] Int. Cl.² .......................................... G01C 27/00
[52] U.S. Cl. ................................. 235/95 R; 235/1 A; 235/117 R
[58] Field of Search ................. 235/95 R, 96, 97, 1 R, 235/1 A, 117 R, 132 R

[56] References Cited

U.S. PATENT DOCUMENTS

| | | | |
|---|---|---|---|
| 1,542,465 | 6/1925 | MacGill | 235/1 R |
| 1,948,946 | 2/1934 | Smith et al. | 235/95 R |
| 3,010,652 | 11/1961 | Heuver et al. | 235/1 A |
| 3,202,353 | 8/1965 | Nowak et al. | 235/95 R |
| 3,229,907 | 1/1966 | Shatas et al. | 235/1 R |
| 3,453,420 | 7/1969 | Freese et al. | 235/132 R |
| 3,571,933 | 3/1971 | Johnson | 235/95 R |
| 3,635,395 | 1/1972 | Walsh | 235/1 A |
| 3,856,195 | 12/1974 | Kakizacki et al. | 235/97 |

Primary Examiner—Stephen J. Tomsky
Attorney, Agent, or Firm—Mitchell B. Wasson

[57] ABSTRACT

A mile post and mileage indicator for maintaining the exact mile post position of a vehicle while said vehicle is travelling upon a roadway containing designated mile post signs, which increase or decrease in a particular direction. This indicator may also be used to indicate exactly how far the vehicle has travelled or how much further it must travel before it reaches a certain destination. The indicator contains a plurality of dials, each dial having two columns of numbers. One column is numbered in an increasing sequence, and the second column is numbered in a decreasing sequence. A shutter is provided for enabling only the increasing or the decreasing columns to be viewed at any one time.

4 Claims, 3 Drawing Figures

U.S. Patent     Dec. 19, 1978     4,130,755
FIG.1.
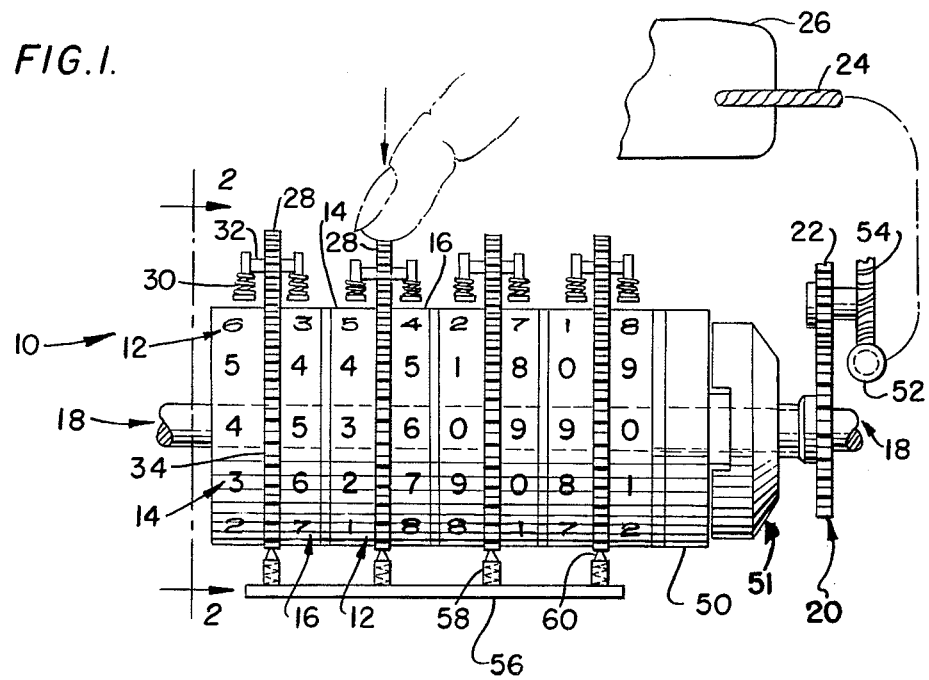
FIG.2.
FIG.3.
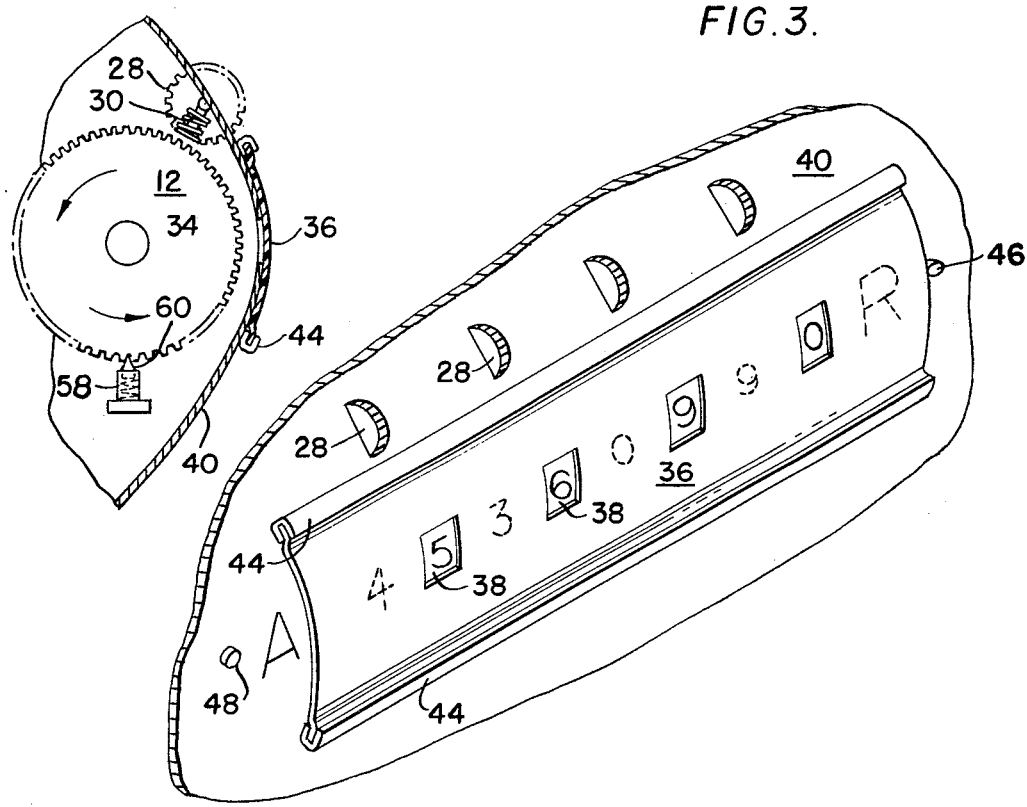

CB TWENTY METER

FIELD OF THE INVENTION

The present invention relates to indicating meters or other devices for keeping a running total of a distance similar to an odometer, or for indicating precisely the exact mileage position of a vehicle.

BACKGROUND OF THE INVENTION

Most trucks on the road today contain a CB unit and a rapidly increasing number of passenger vehicles also contain a CB transceiver. These units are used to obtain such information as road conditions, the weather or are used as a means for conversation. Almost every citizen's band conversation contains a request for the user's location, or, in CB parlance, their "10–20". Most major highways contain mile post indicators appearing on the right shoulder of the road. These indicators denote the distance between the traveller's present location and an arbitrary point, such as the terminus of the highway or a state boundary. These indicators are positioned either every mile or tenth of a mile and usually increase when travelling from south to north and west to east and decrease when traversing from north to south and east to west.

Therefore, while travelling these major highways, the location request or "10–20" usually means that the mile post position of the driver is wanted. Heretofore, a driver would either have to wait until the next mile post marker is passed or would have simply to approximate the location. At the present time, there is no indicator available which would readily allow the CB user, or any other driver to quickly, simply and easily determine his or her exact location on a major highway.

While use of an indicating apparatus containing a plurality of dials, each dial having a series of ascending figures and descending figures is disclosed in U. S. Pat. No. 1,542,465, issued to Charles MacGill, this device does exhibit several drawbacks. The object of the MacGill apparatus is to produce an indicator containing a carry-over gear capable of dealing with indications present on an indicator member, said indications extending from 0 in a positive and negative sense with a uniform progression through 0. To accomplish this end, the MacGill indicator provides a casing for the dials and a longitudinal window in the casing so that a series of numerals may be viewed. The indicator also contains a shutter device having transverse apertures through which, in conjunction with the longitudinal window, the indicator member may be viewed. A gearing arrangement is connected to each of the dials and the shutter, and due to the movement of said gearing arrangement, the proper indication is presented at the longitudinal window. However, to insure that the progression through 0 is a uniform one, the column of figures utilized by each dial (see FIG. 9 of MacGill) is not a continually progressing, or regressing one, but must contain two of each figure to properly present the correct indication. Additionally, the gearing arrangement of MacGill is much more complicated than that of the present invention since MacGill uses an automatic shutter, while the present invention merely employs a manually set shutter.

SUMMARY OF THE INVENTION

The present invention relates to a location indicator which may be used to indicate, at a glance, the exact location of the driver with relation to the aforementioned mile post indicators or any other point of interest. Consequently, this device may also be utilized to indicate exactly how far the driver has proceeded from the beginning of his trip, or how much further he must travel before he reaches his destination. This device contains a plurality of dials, each dial containing two columns of integers 0–9, inclusive. Relative to each other, one column is arranged in ascending order, and the other column is arranged in descending order. A shutter is positioned in front of these dials for longitudinal movement, thereby allowing either one numeral of each ascending column or one numeral of each descending column to be visible. This device is similar in operation to the vehicle's odometer and therefore would utilize a similar mechanical gearing arrangement.

The dials of the present invention only rotate in a single direction regardless of whether the ascending or descending columns are utilized. To be used for the purpose of indicating the vehicle's position similar to the present invention, an odometer would have to rotate in both directions, thereby employing a complicated gearing mechanism.

Although indicators, such as the aforementioned odometers, containing a single dial of integers 0–9 inclusive are old in the art, it should be stressed that these mechanisms cannot be used to effectuate the idea of the present invention due to the increasing or decreasing nature of the sign post indicators. To this end, an indicator is needed which will operate in an additive mode if the sign post indicators are numerically increasing, or in a regressive mode if the sign posts are numerically decreasing.

BRIEF DESCRIPTION OF THE DRAWINGS

FIG. 1 is a plan view of the indicator mechanism;

FIG. 2 is a partial sectional view through 2—2 of the indicating mechanism; and

FIG. 3 is a perspective view of the indicating mechanism showing the sliding window.

DETAILED DESCRIPTION OF THE PREFERRED EMBODIMENT

The present invention is best shown in FIGS. 1 and 3 and contains an indicating unit 10 provided within a casing 40. This casing may be inserted directly into, on top of or under the dashboard of any motor vehicle. The unit 10 includes a plurality of circular indicating members or dials 12, each dial having two columns of integers 14, 16. One column 16 contains the numerals 0–9 in ascending order, and the other column 14 contains the numerals 9–0 in regressing order relative to the first column. FIG. 1 shows a device containing four such of these indicating mechanisms for indicating the hundreds, tens, units and tenths position of the mile posts indicators. It can, of course, be appreciated that the exact number of indicating mechanisms is not crucial to the present invention and any number of dials could be used. All of these circular dials are co-adjacent to one another and are rotatably connected to a central axle 18 for rotation therearound.

As shown in FIG. 2, each dial need only rotate in a single direction. Therefore, while FIG. 2 shows the dials rotating in a counterclockwise motion, it can also be appreciated that they may be rotated only in a clockwise direction.

The central axle 18 itself does not rotate. Rotating on this axle 18 is gear 20, which is driven by gear 22 as shown in FIG. 1. Gear 22 is directly connected to clutch 51 and then to unmarked dial 50 and then through a state-of-the-art tens-transfer mechanism which is utilized in a gearing mechanism to the four dials 12. The driving gear 22 is attached to the transmission 26 of the power train of the automobile via cable 24 in a manner similar to that of a standard odometer such as through worm gear 52 and gear 54. The indicating mechanism (as shown in FIGS. 1 and 2) would constantly be rotating regardless of whether it is being utilized. However, if desired, a spring-activated detant mechanism (not shown but used with clutch 51) could be installed and activated by a control means which would disengage the indicating device when not needed.

A number of thumb wheels 28, one for each of the dials 12, is included for manually setting each of said dials to a specific numeral. These thumb wheels 28 are spring biased by compression springs 30 and run on central axles 32, and since the thumb wheels 28 only engage the dials 12 when said dials are being manually set, the thumb wheels 28 would not rotate when the dials are automatically in use. As depicted in FIG. 1, to operate, the user would merely depress slightly each thumb wheel 28 which engages a ring gear 34 provided on each of the dials for setting the indicating mechanism to the desired mileage reading. To ensure that only one dial rotates when an appropriate thumb wheel 28 is depressed, a ratchet bar 56 is provided having a spring biased means 58 and a tip 60 for each ring gear 34. A standard override mechanism is included allowing the thumb wheels 28 to set the dials 12 to a specific numeral while overriding the standard tens-transfer indexing means such as is shown in U.S. Pat. No. 3,202,353 issued to Nowak et al. As described in the first full paragraph in column 4, the override device includes a counter wheel and retaining ball 96 whereby pressure on indicia sleeves 90, 92, and 94 generates torque sufficient to cam the retaining ball out of its recess so that the sleeves can move relative to the counter wheels.

It is interesting to note that the present invention would properly function only if the sum of each of the laterally adjacent integers on each dial is nine, as shown in FIG. 1. This occurs since, for example, the dial indicating the hundreds position must be indexed when the column of the tens dial in the ascending mode travels between nine and zero and simultaneously, the column of the tens dial in the regressive mode travels between zero and nine. Therefore, the zero and nine in each column of a single dial must be adjacent to the nine and zero respectively of the second column of that dial.

As shown in FIG. 3, a longitudinally moving shutter 36 containing a single window 38 for each of the indicator dials 12 is employed to present a single integer of the ascending column of integers 16, or the regressing column of integers 14 on each of the dials 12 to the viewer. The shutter 36 is positioned on the outside of the indicator casing 40 and is adapted to move in a longitudinal direction according to the need of the user. The shutter 36 is constructed of a flexible, opaque material and is maintained in its longitudinal movement by cooperation with channel members 44 running the length of the shutter 36. Stops 46 and 48 are provided on the indicator casing 40 to limit the movement of the shutter 36.

The letters A and R are printed or otherwise affixed to the indicator casing 40 in the manner depicted in FIG. 3. These letters are used to indicate whether the mechanism is operated in the ascending mode (A) or the regressive mode (R). The ascending mode is employed when the mile post indicators are increasing and the regressive mode is employed when said mile post indicators are decreasing. As shown in FIG. 3, when the indicator is to be used in ascending mode, shutter 36 is moved to the right stop means 46 uncovering letter A but hiding the letter R from view. Similarly, when the regressive mode is employed, shutter 36 is moved adjacent to stop means 48, A is covered and R is unmasked. If the dials 12 rotate in the direction opposite to that shown in FIG. 2, the present invention would operate merely by interchanging the letters A and R.

In operation, once the vehicle has entered upon a highway containing mile post indicators, the shutter is moved to the mode (advancing or regressing) for direction of travel, the indicating mechanism is manually set to the last noted mile post indicator by the use of thumb wheels 28. As an example, FIG. 3 shows that the indicator is being operated in the ascending mode and that the vehicle is presently in the vicinity of mile post indicator 569.0. Therefore, if the vehicle's "10-20" is needed by the driver, the driver would only have to glance at the indicator mechanism to ascertain his exact position. This would also be helpful during an emergency situation when the driver could radio his exact position to assist vehicles in coming to his aid.

The present invention could also be used to indicate the exact mileage that has been traversed in a trip. To accomplish this end, the indicating mechanism is set to its zero position after the shutter has been set in its ascending position. In this manner, once the trip has been completed, the entire distance is easily noted by directly reading the figure appearing through the slide window.

Alternatively the present invention may be utilized for indicating how much more distance must be navigated before the driver reaches a certain destination. To determine this figure, a driver would set the indicating mechanism to the total distance of the trip after setting the shutter to the regressive mode.

While the present invention has been described in terms of a mile post or a mileage indicator, other uses would become apparent to one possessing ordinary skill in the art. Additionally, the gearing mechanism used to advance the indicating mechanisms is not to be construed to be the only such gearing mechanism which can be used. Other gearing mechanisms would be readily apparent to one possessing ordinary skill in the art.

Furthermore, the indicator mechanism disclosed herein can be modified without departing from the spirit or scope of the invention. For example, the dials could be illuminated by a light or series of lights placed in the mechanisms casing or utilized luminescent numerals. Also, to facilitate that the user will quickly recognize the mode that the indicator mechanism is operating, the numerals of the additive mode would be marked in one color, and the numerals of the regressive mode would be marked in a contrasting color. Additionally, each column could be driven electromagnetically through the use of solenoids or by electrical or electronic means, such as a pulse counter.

What is claimed is:

1. A mileage location indicator for indicating the position of a moving vehicle with respect to mile post indicators in a moving vehicle having a power train comprising:

a casing;

a plurality of indicator members disposed on a longitudinal axis in said casing, each indicator member containing a pair of columns, one column having a set of continuously ascending numerals from zero to nine, inclusive, and the other column having a set of continuously descending numerals from nine to zero, inclusive;

tens-transfer indexing means connected to the power train of the vehicle and said indicator members for indexing said indicator members after each unit of distance has been traversed by the vehicle;

shutter means disposed in said casing for longitudinal movement thereon along said axis, said shutter means containing a single aperture for each of said indicator members, whereby when said shutter means is in a first position, a single numeral of only each ascending column is displayed and when said shutter means is in second position, a single numeral of only each descending column is displayed; and manual indexing means engageable with each of said indicator members for setting each of said indicator members to a specific numeral determined by the mile post indicators.

2. A mileage location indicator according to claim 1 further including a stop means disposed on the surface of said casing for limiting movement of said shutter means.

3. A mileage location indicator according to claim 1 wherein said tens-transfer indexing means is a gearing means.

4. A mileage location indicator according to claim 1 wherein the sum of the laterally adjacent integers of each dial is nine.

* * * * *